United States Patent
Del Pino et al.

(10) Patent No.: US 10,897,357 B2
(45) Date of Patent: Jan. 19, 2021

(54) COMPUTATION USING LATTICE-BASED CRYPTOGRAPHY

(71) Applicant: International Business Machines Corporation, Armonk, NY (US)

(72) Inventors: Rafael Del Pino, Rueschlikon (CH); Vadim Lyubashevsky, Zug (CH); Gregory Neven, Oberrieden (CH)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 15/945,163

(22) Filed: Apr. 4, 2018

(65) Prior Publication Data

US 2019/0312727 A1 Oct. 10, 2019

(51) Int. Cl.
*H04L 9/28* (2006.01)
*H04L 9/30* (2006.01)
(Continued)

(52) U.S. Cl.
CPC ............ *H04L 9/3093* (2013.01); *H04L 9/008* (2013.01); *H04L 9/3221* (2013.01)

(58) Field of Classification Search
CPC ...... H04L 9/3093; H04L 9/008; H04L 9/3221
(Continued)

(56) References Cited

U.S. PATENT DOCUMENTS 5,495,532 A * 2/1996 Kilian .................. H04L 9/008
380/30
7,819,319 B2 10/2010 Vernay et al.
(Continued)

FOREIGN PATENT DOCUMENTS

CN 106506523 A 3/2017

OTHER PUBLICATIONS

Baum, C., Damgård, I., Oechsner, S., and Peikert, C. 2016. Efficient Commitments and Zero-Knowledge Protocols from Ring-SIS with Applications to Lattice-based Threshold Cryptosystems. IACR Cryptology ePrint Archive 2016 (2016), 997. Revised Jun. 6, 2017. https://eprint.iacr.org/2016/997/20170606:182447 (Year: 2016).*

(Continued)

*Primary Examiner* — Samson B Lemma
(74) *Attorney, Agent, or Firm* — Daniel Morris; Otterstedt, Wallace & Kammer, LLP

(57) ABSTRACT

The invention relates to a method for performing a multi-party electronic computation using a plurality of evaluating computer systems. The cryptographic security of the multi-party computation is implemented using lattice-based cryptography. Each evaluating computer system receives from each user of a plurality of users an individual input share of an input chosen by the respective user. Furthermore, each evaluating computer system receives from the user a commitment to the received individual input share and an opening information. Each evaluating computer system checks the commitments received to the individual input shares and generates a first lattice-based zero-knowledge proof that all the commitments received are valid commitments to input shares. Each evaluating computer system publishes the first lattice-based zero-knowledge proof. Thus, a verifier may be enabled to verify that all commitments are valid commitments to input shares.

19 Claims, 2 Drawing Sheets

(51) Int. Cl.
*H04L 9/00* (2006.01)
*H04L 9/32* (2006.01)

(58) Field of Classification Search
USPC .......................................................... 380/28
See application file for complete search history.

(56) References Cited

U.S. PATENT DOCUMENTS

| | | | | |
|---|---|---|---|---|
| 10,211,980 | B1* | 2/2019 | Lindell | H04L 9/085 |
| 2005/0021479 | A1* | 1/2005 | Jorba | G06Q 20/3674 |
| | | | | 705/67 |
| 2009/0327141 | A1* | 12/2009 | Rabin | G06Q 20/401 |
| | | | | 705/75 |
| 2010/0121765 | A1 | 5/2010 | Ahrens et al. | |
| 2012/0089494 | A1* | 4/2012 | Danezis | G06Q 20/102 |
| | | | | 705/34 |
| 2013/0014270 | A1* | 1/2013 | Sy | H04L 9/008 |
| | | | | 726/26 |
| 2016/0330018 | A1* | 11/2016 | Miyata | H04L 9/0625 |
| 2017/0085544 | A1 | 3/2017 | Jamin et al. | |
| 2017/0366349 | A1* | 12/2017 | Lyubashevsky | H04L 9/3221 |
| 2018/0309574 | A1* | 10/2018 | Lyubashevsky | H04L 9/3218 |
| 2018/0337775 | A1* | 11/2018 | Camenisch | H04L 9/30 |
| 2018/0359097 | A1* | 12/2018 | Lindell | H04L 9/008 |
| 2019/0334695 | A1* | 10/2019 | Veeningen | G06F 17/16 |
| 2019/0372768 | A1* | 12/2019 | Veeningen | H04L 9/3218 |

OTHER PUBLICATIONS

Bendlin R., Damgård I. (2010) Threshold Decryption and Zero-Knowledge Proofs for Lattice-Based Cryptosystems. In: Micciancio D. (eds) Theory of Cryptography. TCC 2010. Lecture Notes in Computer Science, vol. 5978. Springer, Berlin, Heidelberg (Year: 2010).*

Benhamouda F., Camenisch J., Krenn S., Lyubashevsky V., Neven G. (2014) Better Zero-Knowledge Proofs for Lattice Encryption and Their Application to Group Signatures. In: Sarkar P., Iwata T. (eds) Advances in Cryptology—ASIACRYPT 2014. ASIACRYPT 2014. Lecture Notes in Computer Science, vol. 8873. (Year: 2014).*

Buchmann, Johannes & Büscher, Niklas & Göpfert, Florian & Katzenbeisser, Stefan & Krämer, Juliane & Micciancio, Daniele & Siim, Sander & Vredendaal, Christine & Walter, Michael. (2016). Creating Cryptographic Challenges Using Multi-Party Computation: The LWE Challenge. 11-20. 10.1145/2898420.2898422. (Year: 2016).*

Chillotti I., Gama N., Georgieva M., Izabachène M. (2016) A Homomorphic LWE Based E-voting Scheme. In: Takagi T. (eds) Post-Quantum Cryptography. PQCrypto 2016. Lecture Notes in Computer Science, vol. 9606. Springer, Cham (Year: 2016).*

Costello, Craig & Fournet, Cedric & Howell, Jon & Kohlweiss, Markulf & Kreuter, Benjamin & Naehrig, Michael & Parno, Bryan & Zahur, Samee. (2015). Geppetto: Versatile Verifiable Computation. 2015. 253-270. 10.1109/SP.2015.23. (Year: 2015).*

Damgård I., Fehr S., Salvail L. (2004) Zero-Knowledge Proofs and String Commitments Withstanding Quantum Attacks. In: Franklin M. (eds) Advances in Cryptology—CRYPTO 2004. CRYPTO 2004. Lecture Notes in Computer Science, vol. 3152. Springer, Berlin, Heidelberg (Year: 2004).*

Damgård I., López-Alt A. (2012) Zero-Knowledge Proofs with Low Amortized Communication from Lattice Assumptions. In: Visconti I., De Prisco R. (eds) Security and Cryptography for Networks. SCN 2012. Lecture Notes in Computer Science, vol. 7485. Springer, Berlin, Heidelberg (Year: 2012).*

Lyubashevsky V. (2009) Fiat-Shamir with Aborts: Applications to Lattice and Factoring-Based Signatures. In: Matsui M. (eds) Advances in Cryptology—ASIACRYPT 2009. ASIACRYPT 2009. Lecture Notes in Computer Science, vol. 5912. Springer, Berlin, Heidelberg (Year: 2009).*

Micciancio D., Vadhan S.P. (2003) Statistical Zero-Knowledge Proofs with Efficient Provers: Lattice Problems and More. In: Boneh D. (eds) Advances in Cryptology—CRYPTO 2003. CRYPTO 2003. Lecture Notes in Computer Science, vol. 2729. Springer, Berlin, Heidelberg (Year: 2003).*

Schoenmakers, Berry & Veeningen, Meilof & Vreede, Niels. (2016). Trinocchio: Privacy-Preserving Outsourcing by Distributed Verifiable Computation. 346-366. 10.1007/978-3-319-39555-5_19. (Year: 2016).*

Lisa Kohl, New Tools for Multi-Party Computation, pp. 1-71 Plus i-vi, Master's thesis, Centrum Wiskunde & Informatica, Amsterdam, The Netherlands and Karlsruhe Institute of Technology, Karlsruhe, Germany, Apr. 27, 2016.

Anonymous, Improved Zero-Knowledge Proofs for Lattice Encryption Schemes, Linking Classical and Lattice Primitives, and Applications, downloaded Jun. 16, 2017 from https://www.normalesup.org/~fbenhamo/files/publications/AC_BCKLN14_full.pdf, pp. 1-23.

Chunli Yang et al., An Efficient Lattice-Based Proxy Signature Scheme without Trapdoor, Published in: Intelligent Information Hiding and Multimedia Signal Processing (IIH-MSP), 2015 International Conference on; Date of Conference: Sep. 23-25, 2015 (Abstract only pp. 1-3).

* cited by examiner

COMPUTATION USING LATTICE-BASED CRYPTOGRAPHY

BACKGROUND

The present disclosure relates to the field of computer systems and, more specifically, to a method for performing a multi-party electronic computation using a plurality of evaluating computer systems.

Secure multi-party electronic computation is a subfield of cryptography with the goal of creating methods for a plurality of parties participating in a computation to jointly compute a common result, i.e. function over all the inputs by all the participants, while keeping those inputs private. Unlike traditional cryptographic tasks, where the adversary is outside the system of participants and may act as an eavesdropper on sender and receiver, the adversary in this model may further control one or more of the participants and try to influence the computation.

Thus, there are many aspects to securing a multi-party electronic computation. A particular important ingredient is the underlying cryptographic protocol. Currently deployed multi-party electronic computation is based on cryptographic primitives that rely on the hardness of factoring or discrete logarithms for their security. However, both of these assumptions are well-known to succumb to attacks by quantum computers, meaning that, as soon as sufficiently powerful quantum computers become available, an adversary could use them to break the secrecy of inputs of a past multi-party electronic computation, or to tamper with the result of an ongoing multi-party electronic computation. Hence, there is a need to improve the security of multi-party electronic computation.

SUMMARY

Various embodiments provide a method for performing a multi-party electronic computation using a plurality of evaluating computer systems, a computer program product and an evaluating computer system for executing the method as described by the subject matter of the independent claims. Advantageous embodiments are described in the dependent claims. Embodiments of the present invention can be freely combined with each other if they are not mutually exclusive.

In one aspect, the invention relates to a method for performing a multi-party electronic computation using a plurality of evaluating computer systems. Cryptographic security of the multi-party computation is implemented using lattice-based cryptography. The multi-party electronic computation comprises executing by each of the evaluating computer systems the following steps: From each user of a plurality of users participating in the electronic computation an individual input share of an input chosen by the respective user using a user computer system is received. The input has been split into a plurality of input shares. From each user a commitment to the received individual input share of the respective user is received. Furthermore, an opening information assigned to the respective commitment is received. The opening information proves that the commitment commits to the received individual input share of the respective user. For each user it is checked that the commitment received from the respective user commits to the individual input share received from the same user using the received opening information assigned to the respective commitment. A first lattice-based zero-knowledge proof is generated that all the commitments received from users are valid commitments to input shares. The first lattice-based zero-knowledge proof is published in order to enable a verifier using a verifying computer system to verify that all commitments are valid commitments to input shares.

In a further aspect, the invention relates to a computer program product comprising a non-volatile computer-readable storage medium. The non-volatile computer-readable storage medium has computer-readable program code embodied therewith. The computer-readable program code is configured to implement steps of performing a multi-party electronic computation. Cryptographic security of the multi-party electronic computation is implemented using lattice-based cryptography. The computer-readable program code is configured to implement the following steps of performing a multi-party electronic computation using a plurality of evaluating computer systems, when being executed by one of the evaluating computer systems: From each user of a plurality of users participating in the electronic computation an individual input share of an input chosen by the respective user using a user computer system is received. The input has been split into a plurality of input shares. From each user a commitment to the received individual input share of the respective user is received. Furthermore, an opening information assigned to the respective commitment is received. The opening information proves that the commitment commits to the received individual input share of the respective user. For each user it is checked that the commitment received from the respective user commits to the individual input share received from the same user using the received opening information assigned to the respective commitment. A first lattice-based zero-knowledge proof is generated that all the commitments received from users are valid commitments to input shares. The first lattice-based zero-knowledge proof is published in order to enable a verifier using a verifying computer system to verify that all commitments are valid commitments to input shares.

In a further aspect, the invention relates to an evaluating computer system for contributing to a multi-party electronic computation. The multi-party electronic computation uses a plurality of evaluating computer systems. Cryptographic security of the multi-party electronic computation is implemented using lattice-based cryptography. The evaluating computer system is configured for the following: From each user of a plurality of users participating in the electronic computation an individual input share of an input chosen by the respective user using a user computer system is received. The input has been split into a plurality of input shares. From each user a commitment to the received individual input share of the respective user is received. Furthermore, an opening information assigned to the respective commitment is received. The opening information proves that the commitment commits to the received individual input share of the respective user. For each user it is checked that the commitment received from the respective user commits to the individual input share received from the same user using the received opening information assigned to the respective commitment. A first lattice-based zero-knowledge proof is generated that all the commitments received from users are valid commitments to input shares. The first lattice-based zero-knowledge proof is published in order to enable a verifier using a verifying computer system to verify that all commitments are valid commitments to input shares.

BRIEF DESCRIPTION OF THE DRAWINGS

In the following, embodiments of the invention are explained in greater detail, by way of example only, making reference to the drawings in which.

DETAILED DESCRIPTION

Figure 1:
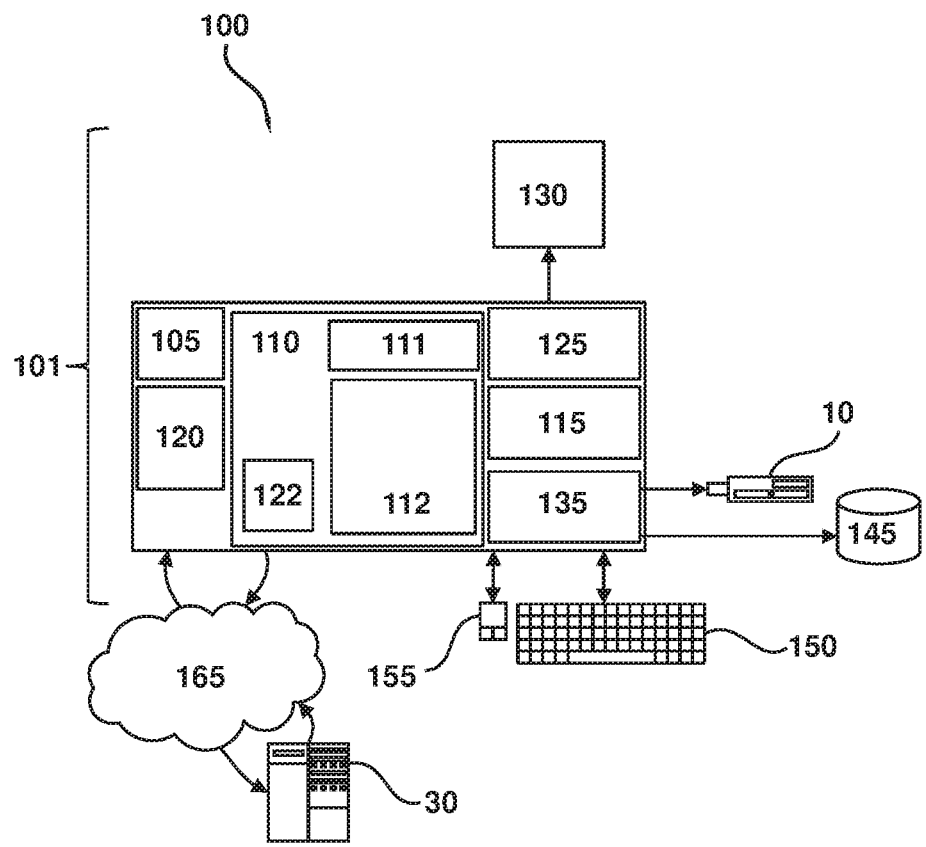
FIG. 1 depicts an exemplary computer system suited for implementing one or more embodiments as involved in the present disclosure and FIG. 2 depicts a schematic flow diagram of an exemplary method for performing a multi-party electronic computation.

The descriptions of the various embodiments of the present invention are being presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In a multi-party electronic computation, a given number of user $V_1, V_2, \ldots, V_n$ each provide private data, i.e. input $v_1, v_2, \ldots, v_n$. The users want to compute the value of a public function F on the private inputs, i.e. $F(v_1, v_2, \ldots, v_n)$, while each keeping their individual inputs secret. Thus, the basic properties that a secure multi-party electronic computation protocol aims to ensure are: input privacy and correctness. Input privacy refers to the property that no information about the individual inputs provided by the users can be inferred from the messages sent during the execution of the protocol. The only information that should be inferred about the individual inputs is whatever could be inferred from seeing the output of the function alone, i.e. the result of the multi-party electronic computation. Correctness refers to the property that any proper subset of adversarial colluding parties willing to share information or deviate from the instructions during the protocol execution should not be able to force honest parties to output an incorrect result. This correctness goal may e.g. either be achieved by guaranteeing that the honest users compute the correct output or aborting the computation if an error is detected.

There are a wide range of practical applications multi-party electronic computation. The multi-party electronic computation according to embodiments may comprise coin tossing by multiple users, electronic auctions, like e.g. compute the market clearing price, electronic voting, averaging over user inputs or privacy-preserving data mining.

For example, electronic voting machines, which require voters to physically turn up at polling stations to cast their ballots on dedicated machines, saw a brief rise in popularity until the early 2000s, but many countries have since then gone back to paper-and-pencil voting amidst worries about security and reliability. One of the reasons for this development has been the discovery of security flaws in several known models of voting machines that were used in past elections.

Nevertheless, many countries are using or considering to introduce online voting, in which voters cast their ballots using personal devices as voting computer systems, i.e. user computer systems. A handful of countries are already using online voting for local and national elections. Online voting is furthermore used as a tool among private organizations to elect officers and board members.

Embodiments may have the beneficial effect that they provide a secure multi-party electronic computation scheme which may e.g. be used for voting schemes, in which the user inputs are votes and the input shares are vote shares.

The result of the multi-party electronic computation in case of a voting scheme is the result of the voting, like e.g. the number of votes for one option out of two.

Embodiments may have the beneficial effect that they keep the inputs private and do not allow the evaluating computer systems to influence the outcome of the multi-party computation. Furthermore, embodiments may provide a secure multi-party electronic computation scheme, which is in particular able to resist attacks by quantum computers. The resistance against quantum computers may be achieved by implemented cryptographic security using lattice-based cryptography. Lattices are able to provide cryptographic problems that resist attacks by quantum computers. Furthermore, embodiments may offer a good trade-off between efficiency and security for basic primitives such as signatures and encryption.

Thus, a lattice-based multi-party electronic computation scheme is disclosed, which may be conjectured to resist attacks by quantum computers. A number of evaluating computer systems, also referred to as evaluating authorities, is involved. The evaluating computer systems contribute to the evaluation of the multi-party electronic computation based on the inputs provided by the users. Using a plurality of evaluating authorities may have the beneficial effect that vote privacy may be maintained as long as at least one of the authorities is honest, while the integrity of the result may be guaranteed even when all authorities collude. Furthermore, the result of the vote may be independently computed by any verifier who wants to verify the result of the multi-party electronic computation.

Lattice-based cryptography is the generic term for constructions of cryptographic primitives that involve lattices, either in the construction itself or in the security proof. Lattice-based constructions are promising candidates for post-quantum cryptography. Unlike more widely used and known public-key schemes such as the RSA or Diffie-Hellman cryptosystems, which are easily attacked by a quantum computer, there are lattice-based constructions that appear to be resistant to attack by both classical and quantum computers. Furthermore, many lattice-based constructions are known to be secure under the assumption that an underlying computational lattice problem cannot be solved efficiently.

A lattice $L \subset \mathbb{R}^n$ is the set of all integer linear combinations of basis vectors $b_1, \ldots, b_n \in \mathbb{R}^n$, i.e. $L = \{\sum_{i=1}^n a_i b_i : a_i \in \mathbb{Z}\}$. For example, $\mathbb{Z}^n$ is a lattice, generated by the standard orthonormal basis for $\mathbb{R}^n$. Therein, the basis for the lattice may not unique.

The security of lattice-based cryptography schemes is based on the apparent hardness of certain problems on point lattices in $\mathbb{R}^n$. Examples of lattice-based cryptography techniques include learning with-errors-based (LWE) key agreement protocols, LWE encryption protocols, ring-learning-with-errors-based (Ring-LWE or RLWE) key agreement protocols, Ring-LWE encryption protocols, ring-learning-with-rounding-based (Ring-LWR or RLWR) key agreement protocols, Ring-LWR encryption protocols, NTRU algorithms (e.g., NTRUEncrypt, NTRUSign, etc.), Bimodal Lattice Signature Schemes (BLISS), PASS algorithms (e.g., PASSSign, etc.), TESLA (Tightly-secure, Efficient signature scheme from Standard LAttices) protocols, ring-TESLA protocols, and others.

The first lattice-based zero-knowledge proof proves that all the commitments received from users are valid commitments to input shares. This may have the beneficial effect that using the respective lattice-based zero-knowledge proof it may be ensured that only valid inputs shares are taken into account for the multi-party electronic computation or that all the input shares taken into account are valid ones, respectively. Thus, the correctness of the multi-party electronic computation may be ensured without spoiling the privacy of the inputs, which are provided to the evaluating computer systems only in form of individual input shares.

An exemplary prototype implementation shows that the users may e.g. require 8 milliseconds to submit an input, like e.g. a vote, of size about 20 KB to each evaluating authority and it may take each evaluating authority 0.15 seconds per user to create a proof that the input of the respective user is valid. The size of the input share that each evaluating authority produces may be approximately 15 KB per user, which is well within the practical bounds for a large-scale multi-party electronic computation, like e.g. an election.

According to embodiments, the method further comprises the following by each of the evaluating computer systems: A combination of input shares is generated. The combination of input shares comprises the individual input shares received by the respective evaluating computer system from the plurality of users. The combination of input shares is published in order to enable a verifier using a verifying computer system to generate a computation result. The computation result is generated by combining the combinations of input shares published by the plurality of evaluating computer systems.

Embodiments may have the beneficial effect that the inputs of the individual users are neither sent to any other participant of the multi-party electronic computation nor published. Only individual input shares are sent to the evaluating computer systems which publish combinations of input shares from different users. The combinations of input shares allow generate the result of the multi-party electronic computation without disclosing the inputs of the individual users.

According to embodiments, the commitments to the individual input shares received by the evaluating computer systems are homomorphic commitments. The method further comprises the following by each of the evaluating computer systems: A combined opening information is generated using the opening information received by the respective evaluating computer system from each of the users. The combined opening information is published in order to further enable the verifier to check for each of the evaluating computer systems that a first combined commitment generated using the commitments to the individual input shares received by the respective evaluating computer system commits to the combination of input shares published by the respective evaluating computer system. For checking the first combined commitment the combined opening information published by the same evaluating computer system are used.

Embodiments may have the beneficial effect that the commitments allow the users to commit to their inputs, i.e. input shares, while keeping the inputs hidden to others, with the ability to reveal the committed input later, when the inputs are evaluated. For example, in case of a vote, the votes may be received first, while the commitments are only received if the evaluation is started. Commitment schemes using cryptographic primitives in form of commitments are designed so that a party cannot change the value or statement after they have committed to it, i.e. commitment schemes are binding.

Embodiments may have the beneficial effect that the commitments to the individual input shares of an input in case of homomorphic commitments may be combined, e.g. multiplied, in order to derive a commitment to the original input. Furthermore, individual input shares from different inputs may thus be combined to a commitment to the combination of the respective input shares.

According to embodiments, the generation of the combined opening information further comprises the following by each evaluating computer system in order to prevent an accumulation of values of the received opening information: A first subset of individual input shares received by the respective evaluating computer system is selected. The input shares of the first subset are combined to a first sub-combination of input shares. A first additional commitment to the first sub-combination of input shares is generated. Furthermore, a first additional opening information assigned to the first additional commitment with a value of the size of the values of opening information assigned to the commitments to individual input shares of the first sub-combination is generated. A second lattice-based zero-knowledge proof is generated that the first additional commitment commits to the same quantity as a combination of the received commitments to the input shares of the first sub-combination. The first additional opening information is used for generating the combined opening information and the second lattice-based zero-knowledge proof is published.

Embodiments may have the beneficial effect that an accumulation of the values of the opening information may efficiently and effectively be prevented. Commitments typically use short vectors as randomness, i.e., opening information, but applying homomorphisms may accumulate the size of this randomness. This accumulation may be compensated for by choosing larger parameters, which comes at a big cost in efficiency. Embodiments may have the beneficial effect that by letting evaluating authorities re-commit to the sum of batches of inputs or input shares, and by letting them prove in zero knowledge that the new commitment indeed contains the combination, e.g. sum, of all input shares in the batch, the accumulation may effectively be prevented. By repetitively applying this technique, each evaluating authority may keep the randomness growth due to adding up opening information within bounds, so that it eventually ends up with a commitment to the sum of all received input shares with short randomness.

According to embodiments, the same size of the values is achieved by each evaluating computer system by using the same probability distribution which is used to generate the received opening information assigned of the commitments to individual input shares for generating each of the first opening information assigned to one of the commitments to one of the first sub-combinations of input shares. Embodiments may have the beneficial effect that may be ensured that the value of the first opening information is of the same order as the individual values of the received opening information. Thus, even though commitments to individual input shares are combined, the opening information used for the resulting combined commitment is kept at a roughly constant size.

According to embodiments, each evaluating computer system selects a plurality of first subsets of commitments. For each one of the plurality first subsets a first sub-combination is generated. For each first sub-combination, a first additional commitment and a first additional opening information are generated. The generation of the combined opening information further comprises the following by each evaluating computer system: A second subset of first sub-combinations generated by the respective evaluating computer system is selected. The first sub-combinations of the second subset to a second sub-combination are combined. A second additional commitment to the second sub-combination is generated as well as a second additional opening information assigned to the second additional commitment with a value of the size of the values of opening information assigned to the first additional commitments. A third lattice-based zero-knowledge proof that the second additional commitment commits to the same quantity as a combination of the generated first additional commitments is generated. The second additional opening information is used for generating the combined opening information and the third lattice-based zero-knowledge proof is published.

Embodiments may have the beneficial effect that combining commitments, more precisely combining commitments to combined input shares, may be performed successively.

According to embodiments, for each of the inputs a lattice-based approximate zero-knowledge proof is provided by the user of the respective input using all the input shares of the input. The approximate zero-knowledge proof proves that an approximation of a second combined commitment combining the commitments to the individual input shares of the respective input commits to a correct input for an approximation of the respective input.

Embodiments may have the beneficial effect that lattice-based approximate zero knowledge proofs may be efficiently generated by the individual users.

Suppose that A is a matrix over $R^{k-1}$ and t is an element in $R^k$ such that there exists an s with small coefficients satisfying A s=t. Then it is possible to very efficiently prove in zero-knowledge using the "Fiat-Shamir with Aborts" technique that there exist s' and c' that satisfy A s'=c't. The coefficients of s' are somewhat larger than those of s and the coefficients of c' are very small. Notice that such proofs are not homomorphic. In other words, giving a proof for $t_1$ and $t_2$ does not give a proof for $t_1+t_2$ because the could be different. This is the main reason why the users cannot simply use these types of proofs by themselves to commit to their inputs.

According to embodiments, each of the first lattice-based zero-knowledge proofs comprises a plurality of lattice-based zero-knowledge sub-proofs generated by each of the evaluating computer systems for each commitment of the plurality of received commitments. The plurality of lattice-based zero-knowledge sub-proofs is generated using an amortized zero-knowledge proof scheme.

Efficient zero-knowledge proofs may be provided, which are tools in multi-party electronic computation schemes to let users prove that they provided a valid input, e.g. cast a valid ballot. Most lattice-based zero-knowledge proofs are either Fiat-Shamir proofs with single-bit challenges or Stern-type proofs with soundness error 2/3, which have to be repeated many times to reduce the soundness error. Amortization techniques exist when performing thousands of proofs in parallel, but these are not very useful, when each user is proving the correctness of his own individual input. Fiat-Shamir with Aborts proofs may provide a much more efficient proof with large challenges, but only allows to prove correctness of the statement up to a small multiple of the witnesses, which could be quite detrimental in the context of computations, like e.g. a voting, as it may allow an attacker to inflate the weight of this input.

Embodiments may have the beneficial effect that a lattice-based electronic multi-party electronic computation is implemented that does use zero-knowledge proofs, but overcomes their inefficiencies by re-organizing the proofs so that the evaluating authorities assist the users in order to provide efficient zero-knowledge proofs by performing amortized proofs. This approach may provably guarantee input privacy as long as one of a number of evaluating authorities is honest, and guarantees consistency. Consistency refers to the property that honest inputs are correctly counted, even if all evaluating authorities are corrupt. All this may be performed under standard lattice-based assumptions in the random-oracle model. The basic idea is to strategically split up the burden of the proofs between users and evaluating authorities. Users may prove that they secret-shared a, e.g. zero-or-one, input using approximate zero-knowledge proofs, while the evaluating computer systems prove that the commitment they received is well-formed, i.e., has short opening information. The evaluating computer systems may so for all users simultaneously, so they are enabled to use more efficient amortized proofs.

Embodiments may have the beneficial effect that they enable utilization of a homomorphic commitment scheme with strategically orchestrated zero-knowledge proofs: users use approximate but efficient proofs to show the validity of their input, while the evaluating computer systems amortized exact proofs to show that the commitments are well-formed. In case proofs should be compose homomorphically, it may be needed to prove the knowledge of s' such that A s'=γ for some fixed γ. While this is quite inefficient for one proof, it can be in fact made very efficient when needing to prove many such relations simultaneously.

To make the multi-party electronic computation scheme-resistant to attacks by quantum computers, it may not be sufficient enough to instantiate the building blocks with quantum-resistant ones, e.g., based on lattices. Any straight-forward conversion to lattice-based primitives may encounter two major efficiency problems:

The first problem is the inefficiency of lattice-based zero-knowledge proofs. For a one-way function f and a value y, a zero-knowledge proof of x is required such that g(x)=y. When g(x) is, for example, an exponentiation as in known discrete log protocols, then such proofs are efficient. In lattice constructions, the function g(x=(s, e)) is usually defined as y=As+e, where A is a public matrix with elements over some ring and s and e are vectors of ring elements.

The second problem is the additive homomorphism that exists for classical schemes, but only partially exists for lattice ones. In particular, if f is an exponentiation, then $g(x_1)=y_1, \ldots, g(x_k)=yk$ implies that $g(\Sigma x_i)=\Pi y_i$. For lattice schemes, if $g(s_i, e_i)=As_i+e_i=y_i$, then $A \Sigma s_i+\Sigma e_i=\Sigma y_i$, but $\Sigma s_i$ and $\Sigma e_i$ become large coefficients. When the sums and thus the coefficients become too large, inverting $\Sigma y_i$ to $\Sigma s_i$, $\Sigma e_i$ is not a hard problem anymore. In other words, it is possible to calculate $\Sigma s_i$, $\Sigma e_i$ by inverting $\Sigma y_i$ using a reasonable computational effort.

A naive way to overcome this issue may be to make the modulus of the ring very large, but this approach has drawbacks regarding the performance and efficiency of the scheme.

To resolve both of these problems, a multi-party electronic computation scheme is suggested which uses efficient relaxations of zero-knowledge proofs. While proving knowledge of pre-images is not efficient, one may prove the knowledge of s, e, f such that g(s, e)=fy, while keeping the coefficients small. Thus, it is not a proof of a pre-image of y, but rather a slightly perturbed y. The proofs may be implemented using efficient amortized proofs, i.e. there are many $y_1, \ldots, y_k$ that satisfy $g(s_i, e_i)=y_i$, then the knowledge of all the pre-images may efficiently be proven. In order for an amortized protocol to be efficient, k may have to be at least in the hundreds.

Contributing to the zero-knowledge proof of the users by the evaluating systems may allow the evaluating computer systems to exploit amortized zero-knowledge proofs, since they may perform proofs for all the users, while individual users are only enabled to perform a proof for their own input. Thereby, efficiency may be increased. In addition, the evaluating computer systems may keep the coefficients of $\Sigma s_i$ and $\Sigma e_i$ from increasing past a certain bound.

Suppose that there are n users and k evaluating computer systems participating in the multi-party electronic computation protocol. Let n and q be integers, let $Z_q$ be the integers modulo q, let R the polynomial ring $Z[X]/(X^n+1)$, let $R_q$ be the quotient ring $R/qR$. An input is an element in the ring $R_q$ that e.g. is either 0 or 1. The user $V_i$ splits his input $v_i$ into m uniformly random polynomials $v_{i,1}, \ldots, v_{i,m} \in R_q$ with only the constant coefficient being nonzero such that $vi_{,1} + \ldots + v_{i,m} = v_i$. Then user $V_i$ computes commitments $C_{i,j}$=Commit($v_{i,j}; r_{i,j}$) for $j=1, \ldots, m$. At this point, the user $V_i$ needs to prove that $C_i := C_{i,1} + \ldots + C_{i,m}$=Commit($v_i, r_i$) where $v_i$ is either 0 or 1.

"Commit" is a deterministic commitment algorithm that, on input a message m, like an input or input share, and random opening information r, produces a commitment C. To open a commitment, the sender reveals m and r so that the receiver may check that C=Commit(m,r). A commitment must be hiding, i.e. the commitment C leaks no information about m, and binding, i.e. no adversary is able open a commitment C to two different messages. Furthermore, the commitment scheme may be an additively homomorphic commitment scheme, i.e. there exist operations ⊙ and ⊕ so that if $C_1$=Commit($m_1, r_1$) and $C_2$=Commit($m_2, r_2$), then $C_1 \odot C_2$=Commit($m_1+m_2, r_1 \oplus r_2$).

However, an exact proof that the commitment $C_i$=Commit($v_i, r_i$) commits to 0 or 1 may be inefficient, while the user may efficiently prove that some perturbation of $C_i$, i.e. f $C_i$ for some polynomial f, is indeed a commitment of either 0 or f. Each user sends $C_{i,j}$, $v_{i,j}$ and $r_{i,j}$, wherein the latter two are encrypted under evaluating computer system j's public key to evaluating computer system $S_j$. After collecting this information from enough user, the evaluating computer system j may perform an efficient amortized proof that $C_{i,j}$ is a valid commitment, i.e. that the randomness $r_{i,j}$ is small for each user $V_i$. Once each evaluating computer systems $S_j$ proves this for each user $V_i$, the commitments for each user may be summed up. Here, $C_i = C_{i,1} + \ldots + C_{i,m}$ is a valid commitment to some input. Previously, the user $V_i$ proved that for some f, f $C_i$ is a valid commitment to either 0 or f. The combination of the two proofs provided by the user $V_i$ and the evaluating computer systems $S_j$ implies that $C_i$ is a commitment to either 0 or 1. The above proofing scheme shows how the combination of the users proving that they have an approximate commitment to 0 or f and the evaluating computer systems proving that the real commitment is a valid one, i.e. the randomness is small, results in a joint proof that the commitment $C_i$ is to 0 or 1. It should be noted that because each evaluating computer system $S_j$ receives a random input share $v_{i,j}$ from each user $V_i$, unless all m evaluating computer systems $S_j$ collude, the privacy of every user's input is preserved.

When all the commitments are commitments to valid input, e.g. votes, a combination of the inputs, like e.g. the sum over all the users and all the evaluating computer systems, provides the result of the multi-party electronic computation, e.g. a correct tally. To reveal this result, each evaluating computer system may open the commitment of the sum of all the input shares that were sent to it. However, the randomness of the sum of the commitments may become too large, when the evaluating computer system sum over all the users. This problem may be resolved as outlined above: for every e.g. 100 commitments of the form Commit($v_{i,j}, r_{i,j}$) that the evaluating computer system $S_j$ receives from 100 user, the evaluating computer systems may compute $v'_j = \Sigma_i v_{i,j}$. Then, the evaluating computer system $S_j$ may choose another small randomness $r_j$ and produce a commitment $C_j$=Commit($v'_j, r_j$). This commitment $c_j$ is a substitutional commitment, i.e. with small randomness, that opens to the same value as the sum of the commitments of the 100 users. The evaluating computer system needs to prove that $C_j$ is a commitment to $v'_j$. However, $v'_j$ is not public, since it is the result of a partial computation. This may be done by proving that $C_j$ and $\Sigma_i C_{i,j}$ commit to the same value, i.e. that $C_j - \Sigma_i C_{i,j}$ is a commitment of zero. The evaluating computer system may do this efficiently using the amortized zero-knowledge proof, because the evaluating computer system will be doing many such "noise-reduction" proofs. In fact, if there are many users, then even the sums of the opening information $r_j$ will eventually get too large, and so the evaluating computer system will need to reduce the sizes of those as well. This noise reduction procedure increases the number of proofs that the evaluating computer system needs to perform, but only by a small amount. If, as in the above example, the evaluating computer system reduced the noise for every 100 users, the sever will have to do only 2% more proofs. With the above two techniques, the evaluating computer systems may be able to prove that the combination, e.g. sum, of all the commitments over all the servers and all the users is a commitment of the combination, e.g. sum, of all the users that were 1.

According to embodiments, the individual input shares received by the evaluating computer system are each encrypted with a public cryptographic key of the receiving evaluating computer system. Embodiments may have the beneficial effect that only the designated evaluating computer system is enabled to evaluate the input shares. Other evaluating computer system are prevented from evaluating input shares not intended to be evaluated by the same. Thus, no evaluating computer system is enabled to reconstruct on its own, which input an individual user provided. This may in general be true as long as there is at least one honest evaluating computer system not sharing the received input shares with other evaluating computer systems. In case of encrypted input shares even a sharing of all the received input shares among evaluating computer systems could not allow for a reconstruction of an individual input by an individual user, as long as at least one of the private cryptographic key, i.e. the decrypting keys, of one of the evaluating computer systems is kept private by the respective evaluating computer system.

According to embodiments, the number of input shares into which the inputs are each split equals the number of evaluating computer systems. Embodiments may have the beneficial effect that the more evaluating computer systems are involved in evaluating a particular input the more effective the security may be. In order to reconstruct an original input provided by an individual user, control over all the evaluating computer systems is required. The larger the number of involved evaluating computer systems, the more difficult it is to gain control over all the respective evaluating computer systems.

According to embodiments, the electronic computation comprises a voting scheme. The inputs are votes and each vote is cast for an option of a predefined set of options. Embodiments may have the beneficial effect of providing a secure and efficient multi-party electronic voting scheme, which may in particular provide effective protection against attacks by quantum computers.

According to embodiments, the predefined set of options comprises two options. A vote for the first one of the two options is cast by selecting a vote of value 0. A vote for the second one of the two options is cast by selecting a vote of value 1. Embodiments may have the beneficial effect that they allow for an efficient evaluation of the vote result: The number of votes for the second option is the sum over the values of all votes, while the number of votes for the first option is the number of voters or the number of voters, which cast a valid vote, minus the sum over the values of all votes.

According to embodiments, the publishing comprises cryptographically signing and sending the information to be published to a publicly accessible server computer system which stores the signed information on a public information platform. Embodiments may have the beneficial effect that everyone may be enabled to generate and verify the result of the multi-party electronic computation. In particular each of the users is enabled as a verifier, e.g. using a user computer system as verifying computer system, to verify the result of the result of the computation.

According to embodiments, the computer-readable program code is further configured to implement any of embodiments of the multi-party electronic computation scheme described herein. According to embodiments, the evaluating computer system is further configured to implement any of embodiments of the multi-party electronic computation scheme descript herein.

FIG. 1 depicts a computer system 100 suited for implementing method steps as involved in the disclosure. In particular, the computer system 100 may be configured as one of a plurality of evaluating computer systems implementing the supporting the evaluation of the multi-party electronic computation. The implementation may in particular comprise supporting the evaluation of the inputs provided by a plurality of users. Furthermore, the computer system 100 may be configured as a user computer system enabling one or more users to provide an input for the multi-party electronic computation, a verifier computer system enabling a verifier to generate and/or verify the result of the multi-party electronic computation or an information platform computer system providing a public information platform, i.e. bulletin board, for publishing information enabling the verifier to generate and/or verify the result of the multi-party electronic computation.

It will be appreciated that the methods described herein are at least partly non-interactive, and automated by way of computerized systems, such as servers or embedded systems. In exemplary embodiments though, the methods described herein can be implemented in a (partly) interactive system. These methods can further be implemented in software 112, 122 (including firmware 122), hardware (processor) 105, or a combination thereof. In exemplary embodiments, the methods described herein are implemented in software, as an executable program, and is executed by a special or general-purpose digital computer, such as a personal computer, workstation, minicomputer, or mainframe computer. The most general system 100 therefore includes a general-purpose computer 101.

In exemplary embodiments, in terms of hardware architecture, as shown in FIG. 1, the computer 101 includes a processor 105, memory (main memory) 110 coupled to a memory controller 115, and one or more input and/or output (I/O) devices (or peripherals) 10, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 145 may generally include any generalized cryptographic card or smart card known in the art.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 110 can have a distributed architecture, where various components are situated remote from one another, but can be accessed by the processor 105.

The software in memory 110 may include one or more separate programs, each of which comprises an ordered listing of executable instructions for implementing logical functions, notably functions involved in embodiments of this invention. In the example of FIG. 1, software in the memory 110 includes instructions or software 112 e.g. lattice-based cryptography protocols as well as instructions to perform a multi-party electronic computation. This may comprise providing inputs (user computer system), evaluating inputs (evaluating computer system), publishing relevant information for generating and verifying results of the multi-party electronic computation (information platform computer system) as well as generating and verifying the results of the multi-party electronic computation (verifier computer system).

The software in memory 110 shall also typically include a suitable operating system (OS) 111. The OS 111 essentially controls the execution of other computer programs, such as possibly software 112 for implementing methods as described herein.

The methods described herein may be in the form of a source program 112, executable program 112 (object code), script, or any other entity comprising a set of instructions 112 to be performed. The software 112 may e.g. implement lattice-based cryptography protocols as well as instructions to perform a multi-party electronic computation. This may comprise providing inputs (user computer system), evaluating inputs (evaluating computer system), publishing relevant information for generating and verifying results of the multi-party electronic computation (information platform computer system) as well as generating and verifying the results of the multi-party electronic computation (verifier computer system). When a source program, then the program needs to be translated via a compiler, assembler, interpreter, or the like, which may or may not be included within the memory 110, so as to operate properly in connection with the OS 111. Furthermore, the methods can be written as an object-oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 145 may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 can be any generalized cryptographic card or smart card known in the art. The system 100 can further include a display controller 125 coupled to a display 130. In exemplary embodiments, the system 100 can further include a network interface for coupling to a network 165. The network 165 can be an IP-based network for communication between the computer 101 and any external server, client and the like via a broadband connection. The network 165 transmits and receives data between the computer 101 and external systems 30, which can be involved to perform part or all of the steps of the methods discussed herein. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals. The computer system 101 may e.g. be an evaluating computers system configured to take part in a multi-party electronic computation using a plurality of evaluating computer systems. The evaluating computers system 101 may receive via the network 165 input shares and commitments from one or more external system 30 which are configured as a user system enabling users to provide inputs for the multi-party electronic computation. Furthermore, the evaluating computers system 101 may sent the results of its evaluation, e.g. combined input shares, combined commitments, amortized zero-knowledge proofs, via the network 165 to an external system 30 which is configured to provide a publicly accessible information platform, i.e. bulletin board, for publishing information sufficient for generating and verifying the result of the multi-party electronic computation.

If the computer 101 is a PC, workstation, intelligent device or the like, the software in the memory 110 may further include a basic input output system (BIOS) 122. The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software 112 stored within the memory 110, to communicate data to and from the memory 110, and to generally control operations of the computer 101 pursuant to the software. The methods described herein and the OS 111, in whole or in part, but typically the latter, are read by the processor 105, possibly buffered within the processor 105, and then executed.

When the systems and methods described herein are implemented in software 112, as is shown in FIG. 1, the methods can be stored on any computer readable medium, such as storage 120, for use by or in connection with any computer related system or method. The storage 120 may comprise a disk storage such as HDD storage.

Figure 2:
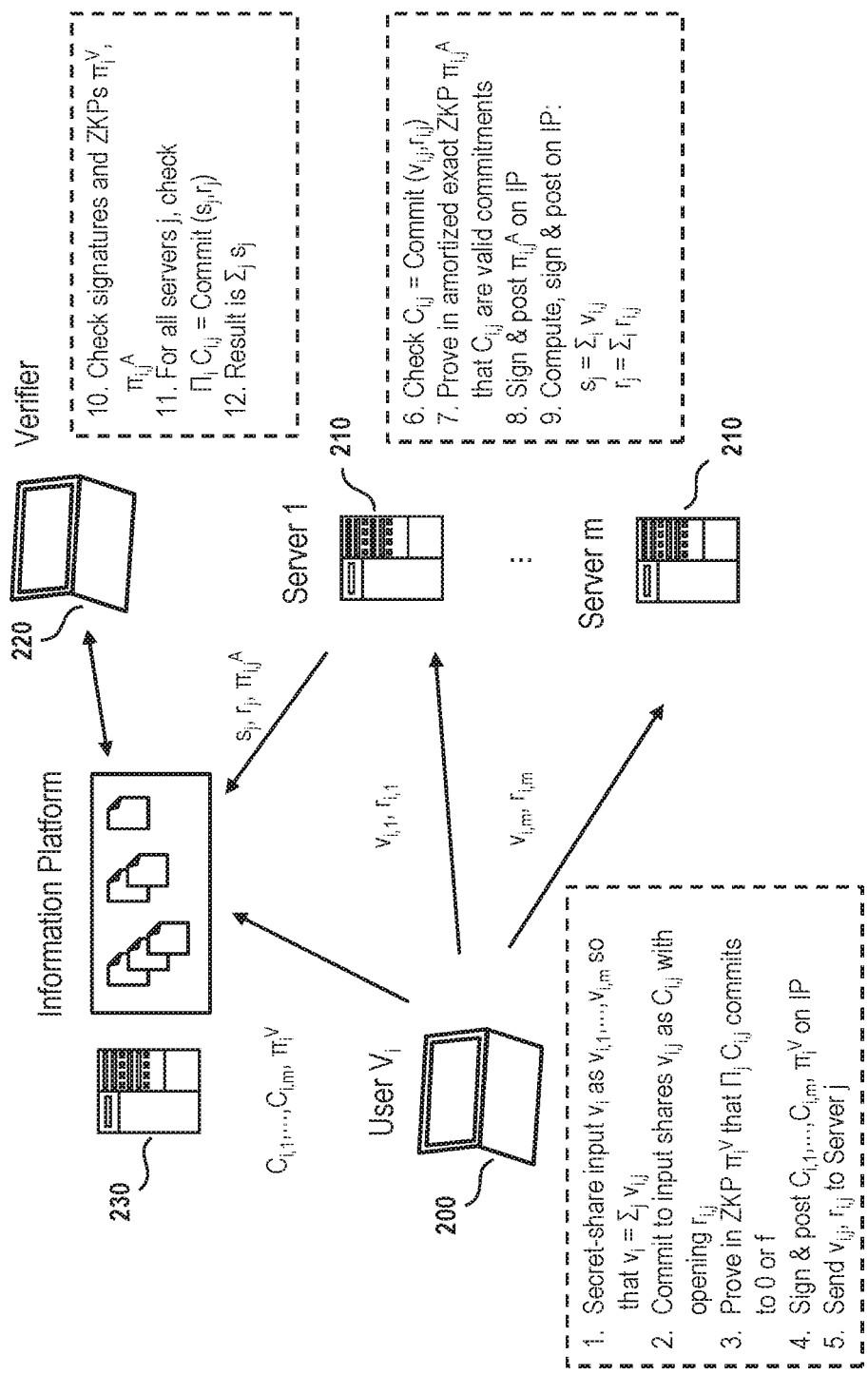

FIG. 2 depicts a schematic flow diagram of an exemplary method for performing a multi-party electronic computation. A computation with n users $V_1, \ldots, V_n$ with inputs $v_1, \ldots, v_n \in \{0,1\}$ may be considered. For example, the multi-party electronic computation may implement an election based on a multi-party electronic voting scheme. In this case, users $V_1, \ldots, V_n$ would be voters casting votes in form of inputs $v_1, \ldots, v_n$. The goal of the multi-party electronic computation is to compute a combination of the inputs, e.g. a sum $\Sigma_{i=1}^n v_i$. A plurality of m evaluating computer systems 210 is provided. A user computer system 200 enables one or more users $V_i$ to provide an input $v_i$. According to embodiments a plurality of user computer systems 200 may be provided. The input $v_i$ of user $V_i$ is split into input shares $v_{i,1}, \ldots, v_{i,m}$, e.g. one input share per evaluating computer system 210, such that $v_i = \Sigma_j v_{i,j}$. The user commits to each input share $v_{i,j}$ with a commitment $C_{i,j}$ and an opening information $r_{i,j}$. The commitment to the input shares may comprise choosing random opening information $r_{i,1}, \ldots, r_{i,m}$ and computing $C_{i,j} \leftarrow \text{Commit}(v_{i,j}, r_{i,j})$. The commitment scheme may be homomorphic, i.e. $C_i = \Pi_{j=1}^m C_{i,j} = \text{Commit}(v_i, r_i)$, where $r_i = \Sigma_{j=1}^m r_{i,j}$. The opening information $r_{i,j}$ is e.g. a random number generated using a probability distribution. The user $V_i$ generates an approximate zero-knowledge proof $\pi_i^V$ that $\Pi_j C_{i,j}$ commits to 0 or f. $C_{i,1}, \ldots, C_{i,m}$ as well as $\pi_i^V$ are signed and sent to server 230 providing a publicly accessible information platform. Furthermore, input share $v_{i,j}$ and opening information $r_{i,j}$ are sent to evaluating computer system j 210.

The evaluating computer systems 210 each receive an input share $v_{i,j}$ and an opening information $r_{i,j}$ from each of the user $V_i$. This data assigned to a particular evaluating computer systems j 210 may be encrypted with a public cryptographic key of evaluating computer systems j 210. Furthermore, evaluating computer systems 210 may retrieve $C_{i,1}, \ldots, C_{i,m}$ as well as $\pi_i^V$ from the information platform 230. Alternatively, $C_{i,j}$ as well as $\pi_i^V$ may be sent to evaluating computer systems j 210 by user computer system 200. Each evaluating computer systems j 210 checks $C_{i,j} = \text{Commit}(v_{i,j}, r_{i,j})$. This may e.g. happen once the predefined period is over and the users had sufficient time for providing their inputs. If not, the evaluating computer system j may post a complaint on the information platform containing $v_{i,j}, r_{i,j}$, and a proof of correct decryption. Furthermore, amortized exact zero-knowledge proofs $\pi_{i,j}^A$ are generated proving that $C_{i,j}$ are valid commitments. Zero-knowledge proofs $\pi_{i,j}^A$ are signed and sent to server 230 providing a publicly accessible information platform. Furthermore, combined input shares $s_j = \Sigma_i v_{i,j}$ and combined opening information $r_j = \Sigma_i r_{i,j}$ are computed, signed and sent to server 230 providing a publicly accessible information platform by each of the evaluating computer systems 210. The combined input shares $s_j = \Sigma_i v_{i,j}$ and combined opening information $r_j = \Sigma_i r_{i,j}$ are combining input shares and opening information originating from different users.

The data received by server 230 is published on the publicly accessible information platform, i.e. bulletin board, provided by server 230 for public access e.g. via a network. A verifier may use a verifying computer system 220 and use the data published on the information platform of server 230 to generate and verify the result of the multi-party electronic computation. The verifier may check signatures and ZKPs $\pi_i^V$, $\pi_{i,j}^A$. For all evaluating computer systems 210, the verifier may check $\Pi_i C_{i,j}$=Commit $(s_j, r_j)$. Furthermore, the verifier may compute the result of the election provided by $s=\Sigma_j s_j$, i.e. $\Sigma_{j=1}^m s_j = \Sigma_{j=1}^m \Sigma_{i \in VV} v_{i,j} = \Sigma_{i \in VV} \Sigma_{j=1}^m v_{i,j} = \Sigma_{i \in VV} v_i$. VV may be the set of valid users $VV \subseteq \{1, \ldots, n\}$ comprising those users for which no complaints have been posted. Anyone is enabled to verify the result by checking the signatures and zero-knowledge proofs and by checking that for all $j=1, \ldots, m$ it holds that $\Pi_{i \in VV} C_{i,j}$=Commit$(s_j, r_j)$.

In the following, the method depicted in FIG. 2 is described in more details: There may be $N_V$ users using one or more user computer systems and $N_A$ evaluating authorities, i.e. evaluating computer systems, that assist in an election. The election may e.g. be a binary election, i.e., where each user provides an input of zero or one and the result is the sum of the inputs. There may further be a public bulletin board where users may post their inputs. The evaluating authorities may jointly compute the tally and post the result of the election, together with a proof of correctness. The goal is to obtain privacy of the inputs, meaning that as long as one authority is honest, the adversary does not learn anything more about the inputs of honest users than what is already implied by the result, as well as consistency and universal verifiability, meaning that anyone is enabled to check that all honest inputs were counted correctly, even if all authorities collude to rig the election.

Each user may secret-share his input among the $N_A$ authorities and commit to each of the shares. The user sends the share and the opening information to each authority, and performs an OR-proof to show that he secret-shared a zero-or-one input by exploiting a homomorphism in the commitment scheme. When an input phase closes, all servers check the openings of the commitments they received.

Each authority then publishes the sum of all the shares it received together with valid opening information, again using the homomorphism in the commitments. The result of the election is the sum of all these partial sums.

The convention may be made that the users and information pertaining to the users are numbered 1 through $N_V$ using a subscript, whereas the information pertaining to the authorities is numbered 1 through $N_A$ and is labeled using a parenthesized superscript.

In particular, for elements $x_i^{(j)}$ it may be defined $x_i = \Sigma_{j=1}^{N_A} x_i^{(j)}$, $x^{(j)} = \Sigma_{i=1}^{N_V} x_i^{(j)}$, and $x = \Sigma_{i=1}^{N_V} \Sigma_{j=1}^{N_A} x_i^{(j)} = \Sigma_{j=1}^{N_A} \Sigma_{i=1}^{N_V} x_i^{(j)}$.

A user $V_i$ who wishes to provide an input $v_i$, which may be 0 or 1, may first split $v_i$ into $N_A$ parts $v_i^{(j)}$ where the first $N_A - 1$ of them are chosen uniformly random modulo q and the last share $v_i^{(N_A)}$ may be chosen such that $\Sigma_{j=1}^{N_A} v_i^{(j)} = v_i$ (mod q). Each $v_i^{(j)}$ is then interpreted as a polynomial in the ring $\mathcal{R}_q$ whose constant coefficient is $v_i^{(j)}$ and the other coefficients are 0. The user $V_i$ then uses the commitment scheme to commit to each share $v_i^{(j)}$ as $$\begin{bmatrix} A \\ B \end{bmatrix} \cdot r_i^{(j)} + \begin{bmatrix} 0 \\ v_i^{(j)} \end{bmatrix} = \begin{bmatrix} a_i^{(j)} \\ b_i^{(j)} \end{bmatrix},$$

where the public commitment key $$\begin{bmatrix} A \\ B \end{bmatrix}$$

is a matrix of uniformly random polynomials.

To commit to an integer $x \in \mathbb{Z}_q$, it may be interpreted as a polynomial in $\mathcal{R}_q$ whose constant coefficient is x and all others are 0, then pick a random vector of polynomials r having small coefficients, and output $$\begin{bmatrix} a \\ b \end{bmatrix} = \begin{bmatrix} A \\ B \end{bmatrix} \cdot r + \begin{bmatrix} 0 \\ x \end{bmatrix}.$$

To open a commitment $$\begin{bmatrix} a \\ b \end{bmatrix}$$

one may simply compute the inverse operation $$\begin{bmatrix} 0 \\ x \end{bmatrix} = \begin{bmatrix} a \\ b \end{bmatrix} - \begin{bmatrix} A \\ B \end{bmatrix} \cdot r.$$

This commitment is binding if finding small solutions to the equation A r=0 mod q is hard, since opening a commitment to two different values implies finding small r and r' such that A r=a=A r'. This problem is called M-SIS (Module Short Integer Solution). The commitment is hiding if distinguishing $$\begin{bmatrix} A \\ B \end{bmatrix} \cdot r$$

from uniform is hard. This problem may be reduced to the M-LWE problem (Module Learning With Error). A useful property of this scheme is that it's additively-homomorphic, i.e. the sum of two commitments is a commitment to the sum of the messages using the sum of the randomnesses. However, one cannot sum an arbitrary number of commitments as finding a solution to A r=0 mod q and thus breaking the binding property becomes easier as the coefficients of r grow.

All the commitments may be published to the bulletin board. Note that because the commitment scheme is additively homomorphic:

$$\sum_{j=1}^{N_A} \begin{bmatrix} a_i^{(j)} \\ b_i^{(j)} \end{bmatrix} = \begin{bmatrix} a_i \\ b_i \end{bmatrix} = \begin{bmatrix} A \\ B \end{bmatrix} \cdot r_i + \begin{bmatrix} 0 \\ v_i \end{bmatrix},$$

which is a valid commitment to $v_i$, but with slightly larger randomness $r_i$. User $V_i$ now creates a zero-knowledge OR-proof that he has knowledge of a vector $\bar{r}_i$ with small coefficients and a ring element $\bar{f}_i$ with very small coefficients such that $$\begin{bmatrix} a_i \\ b_i \end{bmatrix} \cdot \bar{f}_i = \begin{bmatrix} A \\ B \end{bmatrix} \cdot \bar{r}_i + \begin{bmatrix} 0 \\ v_i \cdot \bar{f}_i \end{bmatrix},$$

and $v_i \in \{0,1\}$. This proof $\pi_i^V$ also gets posted to the bulletin board.

Each user now sends to authority j the encryption of the share $v_i^{(j)}$ under authority j's public key and the randomness under which this share was committed $r_i^{(j)}$ from $$\begin{bmatrix} A \\ B \end{bmatrix} \cdot r_i^{(j)} + \begin{bmatrix} 0 \\ v_i^{(j)} \end{bmatrix} = \begin{bmatrix} a_i^{(j)} \\ b_i^{(j)} \end{bmatrix}.$$

Alternatively think the users may simply post this encryption to the bulletin board. Upon receiving all such encryptions from every user, evaluating authority j may create a proof of knowledge that the $r_i^{(j)}$ all have small coefficients. He may use an Amortized Exact Zero-Knowledge proof to create proofs $\pi_{i,j}^A$ that prove the knowledge of $\hat{r}_i^{(j)}$ that satisfies $$A \cdot \hat{r}_i^{(j)} = 2a_i^{(j)}.$$

If all $N_A$ authorities provide proofs of the above statement, then using the additive homomorphism of the commitment scheme, a proof of knowledge of an $\hat{r}_i$ may be obtained such that $$2a_i = \sum_{j=1}^{N_A} 2a_i^{(j)} = \sum_{j=1}^{N_A} A \cdot \hat{r}_i^{(j)} = A \cdot \hat{r}_i.$$

Combining this with $$\begin{bmatrix} a_i \\ b_i \end{bmatrix} \cdot \bar{f}_i = \begin{bmatrix} A \\ B \end{bmatrix} \cdot \bar{r}_i + \begin{bmatrix} 0 \\ v_i \cdot \bar{f}_i \end{bmatrix},$$

implies that $A \cdot (2\bar{r}_i - \bar{f}_i \hat{r}_i) = 0$. Based on the hardness of the M-SIS problem, this implies that $2\bar{r}_i = \bar{f}_i \hat{r}_i$.

One may rewrite the equation above as $$2 \cdot \begin{bmatrix} a_i \\ b_i \end{bmatrix} \cdot \bar{f}_i = \begin{bmatrix} A \\ B \end{bmatrix} \cdot \bar{f}_i \hat{r}_i + \begin{bmatrix} 0 \\ 2v_i \cdot \bar{f}_i \end{bmatrix},$$

and since the challenge may be chosen set such that $\bar{f}_i$ is invertible in $\mathcal{R}_q$, dividing by $\bar{f}_i$ may be applied to obtain $$2 \cdot \begin{bmatrix} a_i \\ b_i \end{bmatrix} = \begin{bmatrix} A \\ B \end{bmatrix} \cdot \hat{r}_i + \begin{bmatrix} 0 \\ 2m_i \end{bmatrix},$$

and $v_i \in \{0, 1\}$.

Because there is no longer the factor $\bar{f}_i$ which could be distinct for every user, the commitment in the above equation is additively homomorphic.

In particular, if computing $$2 \cdot \sum_{i=1}^{N_V} \begin{bmatrix} a_i \\ b_i \end{bmatrix} = \begin{bmatrix} A \\ B \end{bmatrix} \cdot \hat{r} + \begin{bmatrix} 0 \\ 2 \sum_{i=1}^{N_V} v_i \end{bmatrix},$$

and $v_i \in \{0, 1\}$, wherein $\hat{r}$ is a vector with small coefficients, then the quantity $$2 \cdot \sum_{i=1}^{N_V} \begin{bmatrix} a_i \\ b_i \end{bmatrix}$$

is a commitment to twice the total number of 1-inputs that have been cast. If there are many users, then $\hat{r} = \Sigma_i \hat{r}_i$ is not small.

For universal verifiability, the value of $\bar{r}$ to be publicly computable. For this to happen, each authority simply computes $\Sigma_{i=1}^{N_V} r_i^{(j)} = r^{(j)}$ and reveals it by publishing it to the bulletin board. Any verifier may simply check that $$A \cdot r^{(j)} = a^{(j)}.$$

It is claimed that it must be that $$r = \sum_{j=1}^{N_A} r^{(j)} = 2\hat{r}.$$

From $A \cdot \hat{r}_i^{(j)} = 2a_i^{(j)}$, it is known that $$A \cdot \hat{r}^{(j)} = \sum_{i=1}^{N_V} A \cdot \hat{r}_i^{(j)} = 2a^{(j)}.$$

Combining this with $A \cdot r^{(j)} = a^{(j)}$ implies that $A \cdot \hat{r}^{(j)} = 2(r^{(j)})$. Unless one is enabled to break the M-SIS problem, it must be that $\hat{r}^{(j)} = 2r^{(j)}$, and thus $$\hat{r} = \sum_{j=1}^{N_A} \hat{r}^{(j)} = 2 \sum_{j=1}^{N_A} r^{(j)} = 2r.$$

Plugging the above into $$2 \cdot \sum_{i=1}^{N_V} \begin{bmatrix} a_i \\ b_i \end{bmatrix} = \begin{bmatrix} A \\ B \end{bmatrix} \cdot \hat{r} + \begin{bmatrix} 0 \\ 2 \sum_{i=1}^{N_V} v_i \end{bmatrix},$$

and dividing by 2 implies that $$\begin{bmatrix} a \\ b \end{bmatrix} = \sum_{i=1}^{N_V} \begin{bmatrix} a_i \\ b_i \end{bmatrix} = \begin{bmatrix} A \\ B \end{bmatrix} \cdot r + \begin{bmatrix} 0 \\ \sum_{i=1}^{N_V} v_i \end{bmatrix},$$

and $v_i \in \{0, 1\}$.

If r is small enough, then the above implies that $$\begin{bmatrix} a \\ b \end{bmatrix}$$

is a commitment to the full result $\Sigma_{i=1}^{N_V} v_i$, and one may obtain this tally by computing b-B·r. As long as there are fewer than q users, one may exactly recover $\Sigma_{i=1}^{N_V} v_i$ over the integers.

An issue that requires to be dealt with is how to make sure that the randomness, when summed over all the users, does not grow too much. This is required in order for the final commitment in $$2 \cdot \sum_{i=1}^{N_V} \begin{bmatrix} a_i \\ b_i \end{bmatrix} = \begin{bmatrix} A \\ B \end{bmatrix} \cdot \hat{r} + \begin{bmatrix} 0 \\ 2\sum_{i=1}^{N_V} v_i \end{bmatrix}$$

to be meaningful. A trivial way to accomplish this is to simply set the parameters large enough so that a large set of users may be accommodated. However, such an approach is impractical.

Here, it is suggested to overcome this issue is by making the authorities create inputs of 0 using randomness that is close to the randomnesses used by the individual users. For example, if users 1, ..., 1 whose commitments to authority j are $$\begin{bmatrix} a_1^{(j)} \\ b_1^{(j)} \end{bmatrix}, \ldots, \begin{bmatrix} a_1^{(j)} \\ b_1^{(j)} \end{bmatrix}$$

under randomnesses $r_1^{(j)}, \ldots, r_1^{(j)}$, then the evaluation authority may create a input of 0 using randomness $r'=r-\Sigma_i r_i^{(j)}$, where r is a fresh randomness that comes from the same distribution as the commitment randomnesses. The authority may then publish the "input"

$$\begin{bmatrix} a' \\ b' \end{bmatrix},$$

prove that it is a zero-input by proving that there exists some such that $$\begin{bmatrix} A \\ B \end{bmatrix} \cdot \hat{r}' = 2 \begin{bmatrix} a' \\ b' \end{bmatrix},$$

and also prove that there exists a small r̂ such that $$\begin{bmatrix} A \\ B \end{bmatrix} \cdot \hat{r} = 2 \cdot \left( \begin{bmatrix} a' \\ b' \end{bmatrix} + \sum_i \begin{bmatrix} a_i^{(j)} \\ b_i^{(j)} \end{bmatrix} \right).$$

This proof may be "amortized-in" with the proofs $\pi_{i,j}^A$, because the size of the randomness is the same. The proof of $$\begin{bmatrix} A \\ B \end{bmatrix} \cdot \hat{r}' = 2 \begin{bmatrix} a' \\ b' \end{bmatrix},$$

however, contains larger randomness, and so such proofs should be amortized only among themselves. It is also possible to do these proofs in a non-amortized fashion and only get an approximate proof. In this case, depending on the value of 1, the parameters may have to be increased.

Notice that because the randomness of the sum of the commitments $$\begin{bmatrix} a' \\ b' \end{bmatrix} + \sum_i \begin{bmatrix} a_i^{(j)} \\ b_i^{(j)} \end{bmatrix} = \begin{bmatrix} A \\ B \end{bmatrix} \cdot r$$

is as small as in one user commitment. Thus, the size of the sum of the randomness in k user commitments may effectively be reduced to that of one commitment. If this is done for every block of k users, then the sum of the randomness may effectively be reduced by a factor of 1.

Furthermore, this procedure may be repeatable. Once every 1 blocks of inputs have small randomness, it may be considered repeating this procedure by summing over 1 such blocks. This may effectively reduce the total sum of the randomnesses by another factor of 1. If this procedure is continued, then effectively $2(N_V/1+N_V/1^2+\ldots) \approx 2N_V/(1-1)$ extra proofs may be added. The advantage may be that now one only need to worry about the randomness growing by a factor 1 for the proof in $$\begin{bmatrix} A \\ B \end{bmatrix} \cdot \hat{r}' = 2 \begin{bmatrix} a' \\ b' \end{bmatrix}.$$

Parameters may e.g. been set so that 1=30. One may also think of this procedure as the authority summing up 30 inputs, recommitting to the sum using fresh, small randomness, and then giving a proof that he correctly recommitted to the sum of the inputs. In particular, proving that the difference between his new commitment and the sum of the 30 commitments is a commitment to 0.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the 'C' programming language or similar programming languages. The computer readable program instructions may execute entirely on the user computer system's computer, partly on the user computer system's computer, as a stand-alone software package, partly on the user computer system's computer and partly on a remote computer or entirely on the remote computer or server. In the latter scenario, the remote computer may be connected to the user computer system's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Possible combinations of features described above can be the following:

A method for performing a multi-party electronic computation using a plurality of evaluating computer systems, wherein cryptographic security of the multi-party computation is implemented using lattice-based cryptography, the method comprising by each of the evaluating computer systems:

receiving from each user of a plurality of users participating in the electronic computation an individual input share of an input chosen by the respective user using a user computer system, wherein the input is split into a plurality of input shares, receiving from each user a commitment to the received individual input share of the respective user and an opening information assigned to the respective commitment, proving that the commitment commits to the received individual input share of the respective user, checking for each user that the commitment received from the respective user commits to the individual input share received from the same user using the received opening information assigned to the respective commitment, generating a first lattice-based zero-knowledge proof that all the commitments received from users are valid commitments to input shares, publishing the first lattice-based zero-knowledge proof in order to enable a verifier using a verifying computer system to verify that all commitments are valid commitments to input shares.

In another aspect, there is provided the method just described, further comprising by each of the evaluating computer systems:

generating a combination of input shares comprising the individual input shares received by the respective evaluating computer system from the plurality of users, publishing the combination of input shares in order to enable a verifier using a verifying computer system to generate a computation result by combining the combinations of input shares published by the plurality of evaluating computer systems.

In still another aspect, there is provided the method just described, wherein the commitments to the individual input shares received by the evaluating computer systems are homomorphic commitments and the method further comprises by each of the evaluating computer systems:

generating a combined opening information using the opening information received by the respective evaluating computer system from each of the users, publishing the combined opening information in order to further enable the verifier to check for each of the evaluating computer systems that a first combined commitment generated using the commitments to the individual input shares received by the respective evaluating computer system commits to the combination of input shares published by the respective evaluating computer system using the combined opening information published by the same evaluating computer system.

In yet another aspect, there is provided the method just described, wherein the generation of the combined opening information in order to prevent an accumulation of values of the received opening information further comprises by each evaluating computer system:

selecting a first subset of individual input shares received by the respective evaluating computer system, combining the input shares of the first subset to a first sub-combination of input shares, generating a first additional commitment to the first sub-combination of input shares and a first additional opening information assigned to the first additional commitment with a value of the size of the values of opening information assigned to the commitments to individual input shares of the first sub-combination, generating a second lattice-based zero-knowledge proof that the first additional commitment commits to the same quantity as a combination of the received commitments to the input shares of the first sub-combination, using the first additional opening information for generating the combined opening information, publishing the second lattice-based zero-knowledge proof.

In a further aspect, there is provided the method just described, wherein the same size of the values is achieved by each evaluating computer system by generating each of the first opening information assigned to one of the commitments to one of the first sub-combinations of input shares using the same probability distribution which is used to generate the received opening information assigned of the commitments to individual input shares.

In still a further aspect, there is provided the method described just prior to the preceding paragraph, wherein by each evaluating computer system a plurality of first subsets of commitments is selected, wherein for each one of the plurality first subsets a first sub-combination is generated, for each first sub-combination a first additional commitment and a first additional opening information are generated, the generation of the combined opening information further comprising by each evaluating computer system:

selecting a second subset of first sub-combinations generated by the respective evaluating computer system, combining the first sub-combinations of the second subset to a second sub-combination, generating a second additional commitment to the second sub-combination and a second additional opening information assigned to the second additional commitment with a value of the size of the values of opening information assigned to the first additional commitments, generating a third lattice-based zero-knowledge proof that the second additional commitment commits to the same quantity as a combination of the generated first additional commitments, using the second additional opening information for generating the combined opening information, publishing the third lattice-based zero-knowledge proof.

In another alternative aspect, there is provided the method first described above under the "Possible combinations of features," wherein for each of the inputs a lattice-based approximate zero-knowledge proof is provided by the user of the respective input using all the input shares of the input, the approximate zero-knowledge proof proving that an approximation of a second combined commitment combining the commitments to the individual input shares of the respective input commits to a correct input for an approximation of the respective input.

In still another alternative aspect, there is provided the method first described above under the "Possible combinations of features," wherein each of the first lattice-based zero-knowledge proofs comprises a plurality of lattice-based zero-knowledge sub-proofs generated by each of the evaluating computer systems for each commitment of the plurality of received commitments, wherein the plurality of lattice-based zero-knowledge sub-proofs is generated using an amortized zero-knowledge proof scheme.

In yet another alternative aspect, there is provided the method first described above under the "Possible combinations of features," wherein the individual input shares received by the evaluating computer systems are each encrypted with a public cryptographic key of the receiving evaluating computer system.

In a further alternative aspect, there is provided the method first described above under the "Possible combinations of features," wherein the number of input shares into which the inputs are each split equals the number of evaluating computer systems.

In still a further alternative aspect, there is provided the method first described above under the "Possible combinations of features," wherein the electronic computation comprises a voting scheme, wherein the inputs are votes and each vote is cast for an option of a predefined set of options.

In yet a further alternative aspect, there is provided the method just described, wherein the predefined set of options comprises two options, a vote for the first one of the two options is cast by selecting a vote of value 0 and a vote for the second one of the two options is cast by selecting a vote of value 1.

In an even further alternative aspect, there is provided the method first described above under the "Possible combinations of features," wherein the publishing comprises cryptographically signing and sending the information to be published to a publicly accessible server computer system which stores the signed information on a public information platform.

Also provided are a computer program product comprising a non-volatile computer-readable storage medium having computer-readable program code embodied therewith, the computer-readable program code being configured to implement the method for performing a multi-party electronic computation of any of the previous items, when being executed by one or more of the evaluating computer systems; and/or an evaluating computer system configured to execute the method for performing a multi-party electronic computation of any of the previous items.

What is claimed is:

1. A method for performing a multi-party electronic computation using a plurality of evaluating computer systems, wherein cryptographic security of the multi-party computation is implemented using lattice-based cryptography, the method comprising by each of the evaluating computer systems:
    receiving from each user of a user device of a plurality of user devices participating in the electronic computation an individual input share of an input chosen by the respective user using a user computer system, wherein the input is split into a plurality of input shares,
    receiving from each user a commitment to the received individual input share of the respective user and an opening information assigned to the respective commitment, proving that the commitment commits to the received individual input share of the respective user,
    checking for each user that the commitment received from the respective user commits to the individual input share received from the same user using the received opening information assigned to the respective commitment,
    generating a first lattice-based zero-knowledge proof that all the commitments received from users are valid commitments to input shares,
    publishing the first lattice-based zero-knowledge proof in order to enable a verifier using a verifying computer system to verify that all commitments are valid commitments to input shares.

2. The method of claim 1, further comprising by each of the evaluating computer systems:
    generating a combination of input shares comprising the individual input shares received by the respective evaluating computer system from the plurality of users,
    publishing the combination of input shares in order to enable a verifier using a verifying computer system to generate a computation result by combining the combinations of input shares published by the plurality of evaluating computer systems.

3. The method of claim 2, wherein the commitments to the individual input shares received by the evaluating computer systems are homomorphic commitments and the method further comprises by each of the evaluating computer systems:
    generating a combined opening information using the opening information received by the respective evaluating computer system from each of the users,
    publishing the combined opening information in order to further enable the verifier to check for each of the evaluating computer systems that a first combined commitment generated using the commitments to the individual input shares received by the respective evaluating computer system commits to the combination of input shares published by the respective evaluating computer system using the combined opening information published by the same evaluating computer system.

4. The method of claim 1, wherein each of the first lattice-based zero-knowledge proofs comprises a plurality of lattice-based zero-knowledge sub-proofs generated by each of the evaluating computer systems for each commitment of the plurality of received commitments, wherein the plurality of lattice-based zero-knowledge sub-proofs is generated using an amortized zero-knowledge proof scheme.

5. The method of claim 1, wherein the individual input shares received by the evaluating computer systems are each encrypted with a public cryptographic key of the receiving evaluating computer system.

6. The method of claim 1, wherein the number of input shares into which the inputs are each split equals the number of evaluating computer systems.

7. The method of claim 1, wherein the electronic computation comprises a voting scheme, wherein the inputs are votes and each vote is cast for an option of a predefined set of options.

8. The method of claim 7, wherein the predefined set of options comprises two options, a vote for the first one of the two options is cast by selecting a vote of value 0 and a vote for the second one of the two options is cast by selecting a vote of value 1.

9. The method of claim 1, wherein the publishing comprises cryptographically signing and sending the information to be published to a publicly accessible server computer system which stores the signed information on a public information platform.

10. A method for performing a multi-party electronic computation using a plurality of evaluating computer systems, wherein cryptographic security of the multi-party computation is implemented using lattice-based cryptography, the method comprising by each of the evaluating computer systems:
    receiving from each user of a plurality of users participating in the electronic computation an individual input share of an input chosen by the respective user using a user computer system, wherein the input is split into a plurality of input shares,
    receiving from each user a commitment to the received individual input share of the respective user and an opening information assigned to the respective commitment, proving that the commitment commits to the received individual input share of the respective user,
    checking for each user that the commitment received from the respective user commits to the individual input share received from the same user using the received opening information assigned to the respective commitment,
    generating a first lattice-based zero-knowledge proof that all the commitments received from users are valid commitments to input shares,
publishing the first lattice-based zero-knowledge proof in order to enable a verifier using a verifying computer system to verify that all commitments are valid commitments to input shares, generating a combination of input shares comprising the individual input shares received by the respective evaluating computer system from the plurality of users, publishing the combination of input shares in order to enable a verifier using a verifying computer system to generate a computation result by combining the combinations of input shares published by the plurality of evaluating computer systems, wherein the commitments to the individual input shares received by the evaluating computer systems are homomorphic commitments and the method further comprises by each of the evaluating computer systems:

generating a combined opening information using the opening information received by the respective evaluating computer system from each of the users, publishing the combined opening information in order to further enable the verifier to check for each of the evaluating computer systems that a first combined commitment generated using the commitments to the individual input shares received by the respective evaluating computer system commits to the combination of input shares published by the respective evaluating computer system using the combined opening information published by the same evaluating computer system, and wherein the generation of the combined opening information in order to prevent an accumulation of values of the received opening information further comprises by each evaluating computer system:

selecting a first subset of individual input shares received by the respective evaluating computer system, combining the input shares of the first subset to a first sub-combination of input shares, generating a first additional commitment to the first sub-combination of input shares and a first additional opening information assigned to the first additional commitment with a value of the size of the values of opening information assigned to the commitments to individual input shares of the first sub-combination, generating a second lattice-based zero-knowledge proof that the first additional commitment commits to the same quantity as a combination of the received commitments to the input shares of the first sub-combination, using the first additional opening information for generating the combined opening information, publishing the second lattice-based zero-knowledge proof.

11. The method of claim 10, wherein the same size of the values is achieved by each evaluating computer system by generating each of the first opening information assigned to one of the commitments to one of the first sub-combinations of input shares using the same probability distribution which is used to generate the received opening information assigned of the commitments to individual input shares.

12. The method of claim 10, wherein by each evaluating computer system a plurality of first subsets of commitments is selected, wherein for each one of the plurality first subsets a first sub-combination is generated, for each first sub-combination a first additional commitment and a first additional opening information are generated, the generation of the combined opening information further comprising by each evaluating computer system:

selecting a second subset of first sub-combinations generated by the respective evaluating computer system, combining the first sub-combinations of the second subset to a second sub-combination, generating a second additional commitment to the second sub-combination and a second additional opening information assigned to the second additional commitment with a value of the size of the values of opening information assigned to the first additional commitments, generating a third lattice-based zero-knowledge proof that the second additional commitment commits to the same quantity as a combination of the generated first additional commitments, using the second additional opening information for generating the combined opening information, publishing the third lattice-based zero-knowledge proof.

13. A method for performing a multi-party electronic computation using a plurality of evaluating computer systems, wherein cryptographic security of the multi-party computation is implemented using lattice-based cryptography, the method comprising by each of the evaluating computer systems:

receiving from each user of a plurality of users participating in the electronic computation an individual input share of an input chosen by the respective user using a user computer system, wherein the input is split into a plurality of input shares, receiving from each user a commitment to the received individual input share of the respective user and an opening information assigned to the respective commitment, proving that the commitment commits to the received individual input share of the respective user, checking for each user that the commitment received from the respective user commits to the individual input share received from the same user using the received opening information assigned to the respective commitment, generating a first lattice-based zero-knowledge proof that all the commitments received from users are valid commitments to input shares, and publishing the first lattice-based zero-knowledge proof in order to enable a verifier using a verifying computer system to verify that all commitments are valid commitments to input shares, wherein for each of the inputs a lattice-based approximate zero-knowledge proof is provided by the user of the respective input using all the input shares of the input, the approximate zero-knowledge proof proving that an approximation of a second combined commitment combining the commitments to the individual input shares of the respective input commits to a correct input for an approximation of the respective input.

14. A computer program product comprising a non-volatile computer-readable storage medium having computer-readable program code embodied therewith, the computer-readable program code being configured to implement the following steps of performing a multi-party electronic computation using a plurality of evaluating computer systems, when being executed by one of the evaluating computer systems, wherein cryptographic security of the multi-party electronic computation is implemented using lattice-based cryptography:

receiving from each user of a user device of a plurality of user devices participating in the electronic computation an individual input share of an input chosen by the respective user using a user computer system, wherein the input is split into a plurality of input shares, receiving from each user a commitment to the received individual input share of the respective user and an opening information assigned to the respective commitment, proving that the commitment commits to the received individual input share of the respective user, checking for each user that the commitment received from the respective user commits to the individual input share received from the same user using the received opening information assigned to the respective commitment, generating a first lattice-based zero-knowledge proof that all the commitments received from users are valid commitments to input shares, publishing the first lattice-based zero-knowledge proof in order to enable a verifier using a verifying computer system to verify that all commitments are valid commitments to input shares.

15. The computer program product of claim 14, the computer-readable program code further being configured to implement the following steps:

generating a combination of input shares comprising the individual input shares received by the respective evaluating computer system from the plurality of users, publishing the combination of input shares in order to enable a verifier using a verifying computer system to generate a computation result by combining the combinations of input shares published by the plurality of evaluating computer systems.

16. The computer program product of claim 14, wherein the commitments to the individual input shares received by the evaluating computer systems are homomorphic commitments and the computer-readable program code further is configured to implement the following steps:

generating a combined opening information using the opening information received by the respective evaluating computer system from each of the users, publishing the combined opening information in order to further enable the verifier to check for each of the evaluating computer systems that a first combined commitment generated using the commitments to the individual input shares received by the respective evaluating computer system commits to the combination of input shares published by the respective evaluating computer system using the combined opening information published by the same evaluating computer system.

17. An evaluating computer system of a plurality of evaluating computer systems for contributing to a multi-party electronic computation using the plurality of evaluating computer systems, each evaluating computer system comprising a memory and at least one processor, coupled to said memory, wherein cryptographic security of the multi-party electronic computation is implemented using lattice-based cryptography, the at least one processor of the evaluating computer system being configured to perform operations comprising:

receiving from each user of a user device of a plurality of user devices participating in the electronic computation an individual input share of an input chosen by the respective user using a user computer system, wherein the input is split into a plurality of input shares, receiving from each user a commitment to the received individual input share of the respective user and an opening information assigned to the respective commitment, proving that the commitment commits to the received individual input share of the respective user, checking for each user that the commitment received from the respective user commits to the individual input share received from the same user using the received opening information assigned to the respective commitment, generating a first lattice-based zero-knowledge proof that all the commitments received from users are valid commitments to input shares, publishing the first lattice-based zero-knowledge proof in order to enable a verifier using a verifying computer system to verify that all commitments are valid commitments to input shares.

18. The evaluating computer system of claim 17, the operations further comprising:

generating a combination of input shares comprising the individual input shares received by the respective evaluating computer system from the plurality of users, publishing the combination of input shares in order to enable a verifier using a verifying computer system to generate a computation result by combining the combinations of input shares published by the plurality of evaluating computer systems.

19. The evaluating computer system of claim 18, wherein the commitments to the individual input shares received by the evaluating computer systems are homomorphic commitments and the operations further comprising:

generating a combined opening information using the opening information received by the respective evaluating computer system from each of the users, publishing the combined opening information in order to further enable the verifier to check for each of the evaluating computer systems that a first combined commitment generated using the commitments to the individual input shares received by the respective evaluating computer system commits to the combination of input shares published by the respective evaluating computer system using the combined opening information published by the same evaluating computer system.

* * * * *